United States Patent [19]

Ogihara et al.

[11] Patent Number: 5,712,833
[45] Date of Patent: Jan. 27, 1998

[54] DURABLE MAGNETO-OPTICAL DISK HAVING A RARE EARTH-TRANSITION AMORPHOUS MAGNETO-OPTICAL LAYER

[76] Inventors: Noriyuki Ogihara, 5-2-2 Tennoudai, Abiko-shi, Chiba; Yukinobu Yamazaki, 1510-71 Oohata, Niihari-Mura, Niihari-Gun, Ibaraki, both of Japan

[21] Appl. No.: 829,618

[22] Filed: Mar. 31, 1997

Related U.S. Application Data

[63] Continuation of Ser. No. 362,136, Dec. 22, 1994, abandoned.

[30] Foreign Application Priority Data

Dec. 28, 1993 [JP] Japan .................. 5-349704

[51] Int. Cl.[6] .................................. G11B 11/00
[52] U.S. Cl. ........................... 369/13; 369/275.2
[58] Field of Search ......................... 369/13, 275.1, 369/275.2, 275.3, 275.4, 275.5

[56] References Cited

U.S. PATENT DOCUMENTS

| | | | |
|---|---|---|---|
| 5,194,363 | 3/1993 | Yoshioka et al. | 369/275.2 |
| 5,341,349 | 8/1994 | Kagami et al. | 369/275.2 |
| 5,361,248 | 11/1994 | Hatwar et al. | 369/275.2 |
| 5,400,316 | 3/1995 | Igarashi | 369/275.2 |
| 5,430,706 | 7/1995 | Utsunomiya et al. | 369/275.1 |
| 5,442,619 | 8/1995 | Van Uijen et al. | 369/275.2 |
| 5,479,392 | 12/1995 | Holtslag et al. | 369/275.2 |

FOREIGN PATENT DOCUMENTS

| | | |
|---|---|---|
| 2-105352 | 4/1990 | Japan . |
| 2-152050 | 6/1990 | Japan . |
| 2-270145 | 11/1990 | Japan . |
| 3-147546 | 6/1991 | Japan . |
| 3-160644 | 7/1991 | Japan . |
| 3-212834 | 9/1991 | Japan . |
| 3-263626 | 11/1991 | Japan . |
| 4-42452 | 2/1992 | Japan . |
| 5-53022 | 8/1993 | Japan . |

*Primary Examiner*—Nabil Hindi

[57] ABSTRACT

A magneto-optical disk having improved durability and unchanging properties including a substrate, a first dielectric layer, a magneto-optical recording layer, a second dielectric layer and a reflective layer, the second dielectric layer having a heat conductivity greater than that of the first dielectric layer, the magneto-optical layer being made of a ferrimagnetic material of a rare earth-transition amorphous.

8 Claims, 2 Drawing Sheets

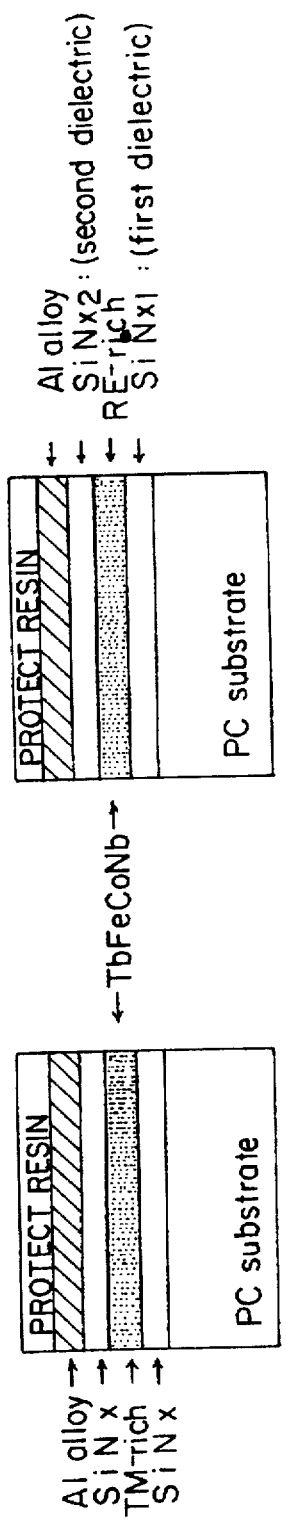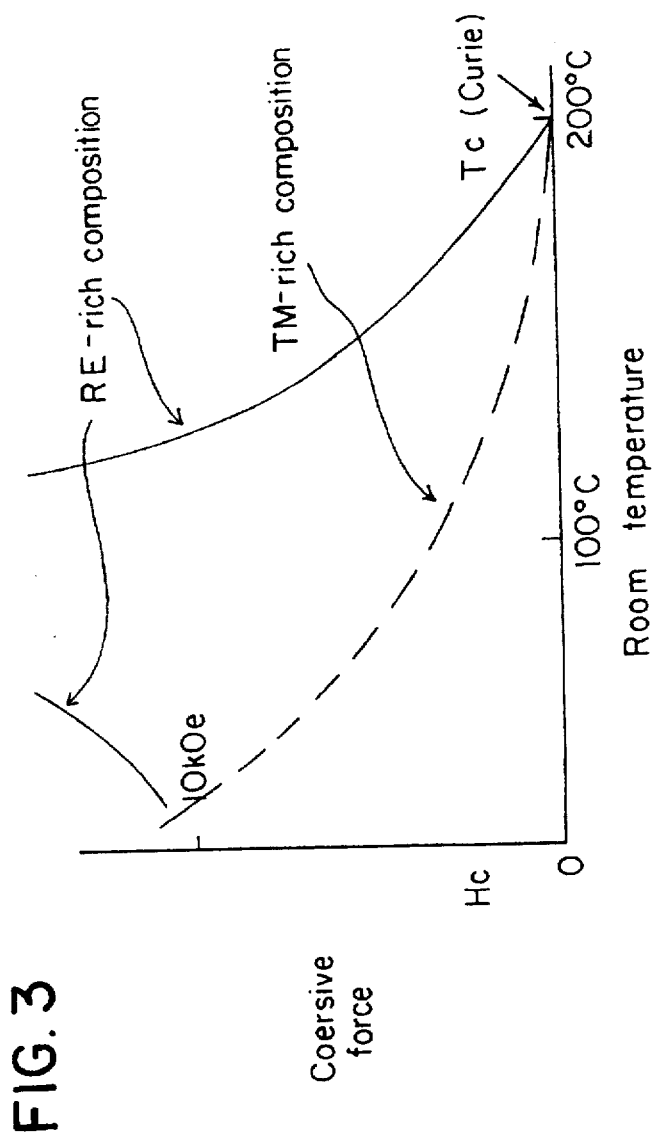

DURABLE MAGNETO-OPTICAL DISK HAVING A RARE EARTH-TRANSITION AMORPHOUS MAGNETO-OPTICAL LAYER

This application is a continuation of application Ser. No. 08/362,136 filed on Dec. 22, 1994, now abandoned.

BACKGROUND OF THE INVENTION

1. Field of the Invention

The present invention relates to a magneto-optical disk. More particularly, the present invention relates to a magneto-optical disk which exhibits good durability and unchanging properties even after repeated recording, reproducing and erasing of information more than about $10^8$ times.

2. Description of the Related Art

A structure of a conventional magneto-optical disk is illustrated in FIG. 2. A conventional magneto-optical disk comprises a transparent substrate (Polycarbonate substrate), a first dielectric layer ($SiN_x$) formed on the substrate, a magneto-optical recording layer (rare earth element-transition metal element rich amorphous alloy, such as TbFeCo) formed on the first dielectric layer, a second dielectric layer ($SiN_x$) which is the same composition material as the first dielectric layer formed on the magneto-optical recording layer and a reflective layer (metal) formed on the second dielectric layer. When the first and the second dielectric layers are the same, heat developing on the disk during the recording and erasing operations is conducted from the surface of the disk to the substrate so that a groove or a pit on the substrate becomes deformed after repeated recording and erasing operations.

To prevent the deformation of the groove or pit, Japanese Patent Kokai Publications No. 147546/1991 and No. 212834/1991 propose magneto-optical disks which comprise a first dielectric layer and a second dielectric layer of different compositions, wherein the second dielectric layer has a higher heat conductivity than that of the first dielectric layer. Japanese Patent Publications No. 42452/1992 and No. 160644/1991 propose magneto-optical disks which comprise first and second dielectric layers wherein the second dielectric layer has a higher heat conductivity than that of the first dielectric layer to improve recording density and linear velocity independence on linear velocity of recording sensitivity. However, when disks are recorded, reproduced and erased of their information more than about $10^8$ times, the technology disclosed in these Patent Publications is not sufficient to prevent deterioration of the properties of the disks repeatedly used.

Japanese Patent Kokai Publications No.292649/1989, 270145/1990, 41637/1991, 44840/1991, 102658/1991, 152736/1991, 168945/1991, 178939/1992, 105352/1990 also propose to control the refractive index or heat conductivity of a dielectric layer so as to improve the chemical stability, mechanical strength, durability and/or recording density of the magneto-optical disks. However, when disks are recorded, reproduced and erased repeatedly of their information, such as more than about $10^8$ times, controlling only the property of the dielectric layer is not enough for maintaining the durability of the respective disk. These Publications do not disclose a change of reflectance of a magneto-optical layer or recording sensitivity after a repetitive use of the disk. It is difficult to prevent deterioration of properties by using only the technologies of these publications.

Japanese Patent Kokai publication No.101466/1993 and 73973/1993 try to improve the durability for repetitive operation of recording and erasing information. Because these magneto-optical disks have a compensation temperature at below room temperature, coercive forces of the disks decrease monotonically from room temperature to the Curie temperature. This causes the signal of the information from the disk to readily deteriorate when the temperature of the magneto-optical layer is increased by reading light power, so that it is difficult to retain the initial properties of the disk. For example, the C/N ratio is decreased undoubtedly after repeated operations of recording, reproducing and erasing information.

For the reasons mentioned above, conventional technology cannot overcome the problems, such as deterioration of reflectance, recording sensitivity or C/N after disks are recorded, reproduced and erased more than about $10^8$ times respectively.

SUMMARY OF THE INVENTION

Therefore, it is an object of the present invention to provide a novel durable magneto-optical disk which will overcome the above-noted disadvantages.

A further object of the present invention is to provide a novel durable magneto-optical disk whose initial properties are not changed even after the disk is recorded, reproduced and erased more than about $10^8$ times.

In order to overcome the disadvantages of the conventional magneto-optical disk, the present invention involves a magneto-optical disk having a transparent substrate, a first dielectric layer formed on the substrate, a magneto-optical recording layer, which is a ferrimagnetic material made of a rare earth-transition amorphous having a compensation temperature and a Curie temperature, the compensation temperature being between the Curie temperature and room temperature, formed on top of the first dielectric layer, a second dielectric layer having a higher heat conductivity than that of the first dielectric layer formed on the magneto-optical recording film, and a reflective layer for increasing the apparent Kerr rotation angle, formed on the second dielectric layer.

In the above magneto-optical disk, because a ferrimagnetic material made of rare earth-transition amorphous for magneto-optical layer has a compensation temperature between the Curie temperature and room temperature, the coercive force of the material is larger in the high temperature range rather than at room temperature. Taking advantage of this magnetic property, the magnetic film can reliably retain the initially recorded signal on the disk even when a beam of a light used to read a change in the magnetic direction of the magnetic film, is radiated continuously at the disk. The second dielectric layer has a higher heat conductivity than that of the first dielectric layer so that heat, generated by a laser beam, flows to the reflective layer side and not to the substrate side. In addition, in the high temperature range, the coercive force of the magneto-optical layer increases rapidly as the temperature is increased. Taking advantage of these properties prevents changing of the coercive force of the magneto-optical layer even when information is recorded, reproduced and erased repeatedly.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a cross-sectional view of the magneto-optical disk of the present invention which has two different materials for the dielectric layers;

FIG. 2 is a cross-sectional view of a conventional magneto-optical disk whose composition of the first dielectric layer is the same as that of the second dielectric layer;

FIG. 3 is a characteristic diagram of temperature versus coercive force for a magneto-optical recording layer which has a rare earth element rich composition, having a Tb content of from 24 to 26 atomic %, and a magneto-optical recording layer which has a transition metal element rich composition having a Tb content of less than 22 atomic %;

DETAILED DISCUSSION OF THE INVENTION

Figure 4:
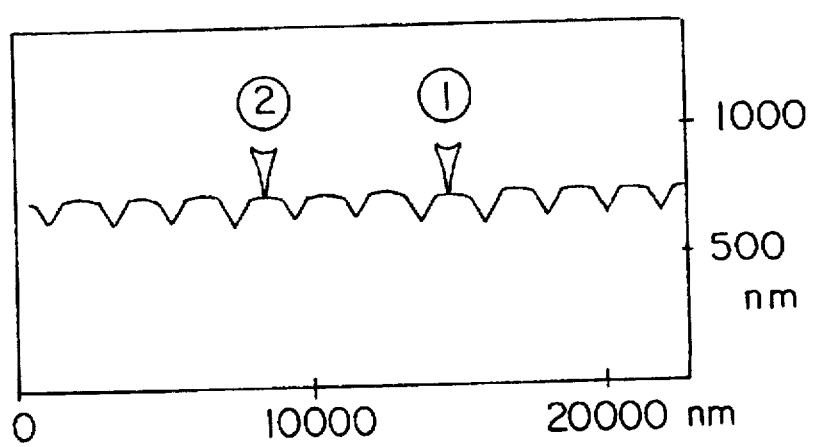
FIG. 4 is a cross-sectional view for tracks on the substrate of example 2 after recording, reproducing and erasing information $10^8$ times.

FIG. 1 is a cross-sectional view of the magneto-optical disk of the present invention which has two dielectric layers of different compositions. A transparent substrate typically of polycarbonate (PC) or UV resin mastered glass with a track having a groove and/or a prepit for address, timing and tracking information on one surface thereof is prepared by a well known manner. The substrate is preferably dehydrated in advance. Namely, just before depositing a first dielectric layer on the substrate, the substrate is preferably dried under a reduced pressure, below air pressure, at from 40° to 120° C. for at least 10 minutes. Drying the substrate is preferable for preventing deformation of the substrate during local heating by laser irradiation, which leads to a tracking error or other information error. Especially, when plastic is used for the substrate, the thermal deformation temperature of the plastic depends on the quantity of water in the plastic so that the thermal deformation temperature of the plastic can be raised by desiccating the substrate.

Silicon nitride, such as $SiN_{x1}$ or $SiN_yO_z$, as the first dielectric layer is formed on the substrate. The composition of the silicon nitride can be controlled by adjusting the partial pressure of the gas during the deposition operation. A magneto-optical recording layer is formed on top of the first dielectric layer. The magneto-optical recording layer is, for example, a ferrimagnetic material made of a rare earth-transition metal amorphous alloy having a specified compensation temperature and a Curie temperature, the compensation temperature being between the Curie temperature and room temperature.

When a ferrimagnetic material, which mainly comprises TbFeCoNb, is used for the magneto-optical recording layer, the compensation temperature can be controlled by adjusting the ratio of constituent elements, for example, the ratio of rare earth element, Tb and transition metal elements, Fe and Co. For instance, when the amount of Tb is from 24 to 26 atomic % of the magneto-optical recording layer in the present invention, the compensation temperature of the magneto-optical recording layer is from about 50° to 100° C. Namely, the compensation temperature can be controlled between the Curie temperature and room temperature. For the sake of convenience, the magneto-optical layer which has a Tb content of from 24 to 26 atomic % of the magneto-optical recording layer, is called a rare earth element (RE) rich composition whereas the magneto-optical layer which has a Tb content of less than 22 atomic % of the magneto-optical recording layer is called a transition metal element (TM) rich composition.

The solid line in FIG. 3 is a characteristic diagram of temperature versus coercive force for a magneto-optical recording layer which has a rare earth element rich composition (RE-rich). The coercive force of this layer is very high even around 100° C. The dotted line in FIG. 3 is for a magneto-optical recording layer which has a transition metal element rich composition (TM-rich). The coercive force of a TM-rich layer is very small as compared with the RE-rich layer, below 200° C., and the compensation temperature of the TM-rich composition layer is below room temperature.

Because the coercive force of the magneto-optical recording layer in the present invention is very high even when the temperature of the disk approaches 100° C., by applying a reproducing power continuously, the magneto-optical disk of the present invention can maintain stable recorded information. On the other hand, because the coercive force of the TM-rich magneto-optical recording layer continues decreasing with increasing temperature, the recorded information in the TM-rich magneto-optical disk is liable to be erased when a reproducing power is applied to the disk continuously.

Silicon nitride, such as $SiN_{x2}$, as the second dielectric layer, is formed on the substrate. When the heat conductivity of the second dielectric layer of the present invention is larger than that of the first dielectric layer, the heat which is applied to the disk by a laser beam is conducted to an reflective layer side of the disk rather than to the substrate side of the disk so that the heat is released from the reflective layer side to prevent an excessive high temperature build-up of the disk and to prevent deformation of the substrate.

When the heat capacity, which is in proportion to the product of the specific heat multiplied by the weight, of the second dielectric layer is smaller than that of the first dielectric layer, the heat is also similarly conducted to the reflective layer side rather than to the substrate side of the disk and the same result can be achieved.

To obtain a disk having the above heat conductivity characteristics when the first dielectric layer has a formula $SiN_{x1}$ and the second dielectric layer has a formula $SiN_{x2}$, x1 should be larger than x2, or x1>x2, preferably $0.70 \leq x1 \leq 1.3$ and $0.4 \leq x2 \leq 1.0$, more preferably $0.70 \leq x1 \leq 1.0$ and $0.4 \leq x2 < 0.96$, the most preferred $0.75 \leq x1 \leq 0.90$. When the first dielectric layer has a formula $SiN_yO_z$ and the second dielectric layer has a formula $SiN_{x2}$, the relationship between x2, y and z should be expressed as $1.2 \leq 3 \times 2 < 3y + 2z \leq 4$.

The composition of the silicon nitride for the first or the second dielectric layer may be controlled by making the total gas pressure (P2), including nitride or oxygen gas and argon gas, in the depositing process of the second dielectric layer be smaller than the total gas pressure (P1) in the depositing process of the first dielectric layer, for example, P2/P1 may be from ½ to ⅕. To be more precise, when P1 is 0.2 Pa, $N_2$ partial pressure of P1 may be from 3% to 8%, P2 may be 0.1 Pa and $N_2$ partial pressure of P2 may be from 3% to 7%.

In addition to a combination of using the RE-rich magneto-optical layer and dielectric layer having specific properties, the inventors have found that using a dried substrate in the present invention gives additional multiplier effects such as follows:

(a) Preventing contamination of the deposited layer, such as the dielectric layer or magneto-optical layer, by impurity gas, such as $O_2$ or $Cl_2$ or water in the substrate;

(b) Preventing a migration of residual water or residual impurity gas in the substrate, such as oxygen gas or chlorine gas, to the layers, when the heat which is applied to the disk by a laser beam, is conducted to an reflective layer side rather than to the substrate side of the disk. The content of water in the substrate is at the most 2000 ppm, preferably 1500 ppm, and most preferred 1000 ppm. The heat is released from the reflective layer side to prevent excessive high temperature of the disk. Because of this mechanism, it is difficult for the residual water or gas to react on a layer, such as the magneto-optical layer or the dielectric layer. Accordingly, oxidation of the layers can be prevented;

(c) Variation of the coercive force of the magneto-optical layer is small even when impurities contaminate the layers of the disk and the layers are oxidized or structure relaxation of the layers takes place, because the coercive force of the magneto-optical recording layer of the present invention, or the RE-rich magneto-optical recording layer, depicts a sharp increase from the Curie temperature towards the lower temperature region; this gives rise to extraordinary stability of the recorded signals in the course of repeated erase/write/read processes. That is, the coercive force is very high when the temperature of the disk reaches around 100° C., due to the application of a reproducing power continuously. A small variation of the coercive force of the magneto-optical layer contributes greatly to preventing C/N deterioration and keeping a variation of the recording sensitivity small. A recording power sensitivity, for example, the recording power at a threshold point of the C/N increase, and Curie temperature of the magneto-optical layer are correlated, so as to correspond to a recording power at a developing point of a recording bit.

On the other hand, the temperature corresponding to the recording power which determines the final recording bit size can be estimated by the following consideration. The shape and size of the recording bits on a recording area are fixed when a total of a bias magnetic field, a flotation or demagnetization field, caused by the magneto-optical layer, and a magnetic domain wall magnetic field which originates from magnetic domain wall energy, and spacial distribution of the coercive force generated in proportion to the spacial distribution of temperature generated by the recording laser light beam, cross each other. In other words, the shape and size of the recording bits on a recording area are fixed to the specific area where the total of a bias, a demagnetization and a magnetic domain wall magnetic fields is larger than a coercive force of the magneto-optical layer at the laser light beam irradiation area.

On the condition that TM-rich and RE-rich magneto-optical layers have the same Curie temperature, for example, 210° C., the most suitable writing temperature, calculated by simulation for the TM-rich magneto-optical layer, is lower than that for the RE-rich magneto-optical layer, because the TM-rich composition generate more demagnetization or flotation magnetic field than the RE-rich composition in the high temperature region. This is disclosed, for example, in the publication, Proc., of, MORIS'92, PP188–191. However, larger demagnetization field and low coercivity for TM-rich composition material causes reversed domains during the recording process and tends to show size and shape fluctuation in the recorded signals. RE-rich composition material, on the other hand, due to the step coercive force increase from Curie temperature towards the lower temperature region, retains sharp-edged recorded domains without size fluctuation, even after numerous repeated erase/write/read cycles.

An enhanced layer for increasing the apparent Kerr rotation angle is formed on the second dielectric layer.

PREFERRED EMBODIMENTS

The present invention will be illustrated by following Examples.

Example 1

A Polycarbonate substrate, coated with an ultraviolet (UV) resin on the light beam exposed side of the substrate, is dried in a vacuum drying furnace at the pressure of $10^{-3}$ Pa, the temperature of 80° C. for 3 hours, the content of water in the substrate being about 850 ppm. The $SiN_{x1}$ is sputtered on the substrate as a first dielectric layer, using a SiN target in an Ar gas and $N_2$ gas atmosphere, the total gas pressure being 0.2 Pa. To make $x_1$ be 1.0, the $N_2$ pressure is adjusted to 8%. The thickness of the first dielectric layer was 850 Å.

Next, a magneto-optical recording layer, which has a rare earth element rich composition is sputtered on the first dielectric layer, using a $Tb_{25}Fe_{61}Co_{12}Nb_2$ target to deposit a RE-rich composition at Ar gas atmosphere, the pressure of 0.2 Pa. The thickness of the magneto-optical recording layer was 250 Å.

Next, the $SiN_{x2}$ is sputtered on the magneto-optical recording layer as a second dielectric layer, using the same method as for the first dielectric layer. To make $x_2$ to be 0.9, the total gas pressure of Ar and $N_2$ is 0.1 Pa and the $N_2$ pressure is adjusted to 7%. The thickness of the second dielectric layer was 200 Å.

At the end, AlTi is sputtered on the second dielectric layer as an reflective layer, using $AlTi_3$ target and UV resin was coated on the reflective layer for protection of the disk. The thickness of the reflective layer was 500 Å.

Example 2

In the same manner as in Example 1, except that x1 of the first dielectric layer is adjusted to 0.90 by adjusting the total gas pressure of Ar and $N_2$ to 0.1 Pa and the $N_2$ pressure to be 7%, x2 of the second dielectric layer was adjusted to 0.70 by adjusting the $N_2$ pressure to be 5%, the magneto-optical disk is produced.

Example 3

In the same manner as in Example 1, except that $SiN_yO_z$ is sputtered on the substrate as a first dielectric layer, using a SiO target in an Ar gas, $N_2$ gas and $O_2$ gas atmosphere. To make y, z, and x2 be 0.3, 1.5, and 0.7 respectively, the $N_2$ pressure and $O_2$ pressure were adjusted to 5% and 10% respectively, the magneto-optical disk was produced.

Comparative Example 1

In the same manner as in Example 1, except that with the omission of the drying process of the substrate and using a $Tb_{20}Fe_{66}Co_{12}Nb_2$ target to deposit TM-rich composition in place of $Tb_{25}Fe_{61}Co_{12}Nb_2$ target, the sputtering of $SiN_{x1}$ as the same composition of the first dielectric layer and the second dielectric layer on the magneto-optical recording layer, in place of the $SiN_{x2}$, and using the same method for depositing both the first and second dielectric layers, the magneto-optical disk is produced. The content of water in the substrate was 2500 ppm.

Comparative Example 2

In the same manner as in Example 1, except with the omission of the drying process of the substrate and with the sputtering of $SiN_{x1}$ as the same composition of the first dielectric layer and the second dielectric layer. On the magneto-optical recording layer, in place of $SiN_{x2}$, and using the same method for depositing the first and second dielectric layers, the magneto-optical disk is produced.

Comparative Example 3

In the same manner as in Example 1, except with using a $Tb_{20}Fe_{66}Co_{12}Nb_2$ target to deposit the TM-rich composition in place of $Tb_{25}Fe_{61}Co_{12}Nb_{12}$ target, with x1 of the first dielectric layer being adjusted to 0.90 by adjusting the $N_2$ pressure to be 7%, and $x_2$ of the second dielectric layer adjusted to 0.70 by adjusting $N_2$ pressure to be 5%, the magneto-optical disk is produced.

Comparative Example 4

In the same manner as in Example 2, except for the omission of the drying process of the substrate, the magneto-optical disk is produced.

The structures of the magneto-optical disks produced in Examples 1 to 3 and comparative Examples 1 to 4 with their properties are set forth as follows:

EXAMPLE 1

| | | | |
|---|---|---|---|
| | 500Å | ← AlTi | |
| | 200Å | $SiN_{x2}$ $x_2 = 0.9$ | Heat conductivity: (0.02 W/cm/K) |
| TbFeCoNb → | 250Å | | |
| RE-rich Composition | 850Å | $SiN_{x1}$ $x_1 = 1.0$ | Heat conductivity: (0.008 W/cm/K) |
| Compensation | | | |
| Temperature 80–100° C. | PC (Dried) | | |
| Hc = 12kOe | | | |

EXAMPLE 2

| | | | |
|---|---|---|---|
| | 500Å | ← AlTi | |
| | 200Å | $SiN_{x2}$ $x_2 = 0.7$ | Heat conductivity: (0.05 W/cm/K) |
| TbFeCoNb → | 250Å | | |
| RE-rich Composition | 850Å | $SiN_{x1}$ $x_1 = 0.9$ | Heat conductivity: (0.02 W/cm/K) |
| Compensation | | | |
| Temperature 80–100° C. | PC (Dried) | | |
| Hc = 12kOe | | | |

EXAMPLE 3

| | | | |
|---|---|---|---|
| | 500Å | ← AlTi | |
| | 200Å | SiNx x = 0.7 | Heat capacity: 1.6 J/cm³/K |
| | | | Heat conductivity: (0.05 W/cm/K) |
| TbFeCoNb → | 250Å | | |
| RE-rich Composition | 1100Å | $SiNyOz$ y = 0.3; z = 1.5 | Heat conductivity: (0.006 W/cm/K) |
| Compensation | | | Heat capacity: 2.4 J/cm³/K |
| Temperature 80–100° C. | PC (Dried) | | |
| Hc = 12kOe | | | |

COMPARATIVE EXAMPLE 1

| | | | |
|---|---|---|---|
| | 500Å | ← AlTi | |
| | 200Å | | |
| TbFeCoNb → | 250Å | SiNx x = 1.0 | Heat conductivity: (0.008 W/cm/K) |
| TM-rich Composition | 850Å | | |
| Hc = 12kOe | | | |
| | PC (Not Dried) | | |

COMPARATIVE EXAMPLE 2

| | | | |
|---|---|---|---|
| | 500Å | ← AlTi | |
| | 200Å | SiNx x = 1.0 | Heat conductivity: (0.008 W/cm/K) |
| TbFeCoNb → | 250Å | | |
| RE-rich Composition | 850Å | | |
| Compensation | | | |
| Temperature 80–100° C. | PC (Not Dried) | | |
| Hc = 12kOe | | | |

COMPARATIVE EXAMPLE 3

| | | | |
|---|---|---|---|
| | 500Å | ← AlTi | |
| | 200Å | $SiNx_2$ $x_2 = 0.7$ | Heat conductivity: (0.05 W/cm/K) |
| TbFeCoNb → | 250Å | | |
| TM-rich Composition | 850Å | $SiNx_1$ $x_1 = 0.9$ | Heat conductivity: (0.02 W/cm/K) |
| Temperature 80–100° C. | PC (Dried) | | |
| Hc = 12kOe | | | |

COMPARATIVE EXAMPLE 4

| | | | |
|---|---|---|---|
| | 500Å | AlTi | |
| | 200Å | $SiNx_2$ $x_2 = 0.7$ | Heat conductivity: (0.05 W/cm/K) |
| TbFeCoNb → | 250Å | | |
| RE-rich Composition | 850Å | $SiNx_1$ $x_1 = 0.9$ | Heat conductivity: (0.02 W/cm/K) |
| Compensation | | | |
| Temperature 80–100° C. | PC (Not Dried) | | |
| Hc = 12kOe | | | |

Variations in the properties of each magneto-optical layer after the information is recorded, reproduced and erased more than about $10^8$ times are measured. The results are shown in Tables 1 to 4. Table 1 shows a variation of a minimum recording power which can produce more than 40 dB of C/N. Table 2 shows a variation of the land level modulation factor. Table 3 shows a variation of the maximum C/N. Table 4 shows a correlation between a variation of coercive force (Hc) at the most suitable calculated temperature for recording and a variation of power where secondary harmonics is the minimum. According to the reference, Proc., of, MORIS'92, PP188–191, the most suitable temperature for the recording in a TM-rich composition is 160° C. and for RE-rich composition is 180° C. In this condition, the shape and size of the recording bit are ideal, because the shape and size of the recording bit written at the power which generates the minimum secondary harmonics and input signal are in harmony.

These dynamic characteristics were measured at the following conditions.

Linear velocity: 5.65 m/s
Recording frequency: 3.7 MHz
Recording pulse width: 60 ns
Reproducing power: 2.0 mW
Applied magnetic field: 400 Oe
Recording power: 8 mW
Erasing power: 10 mW

TABLE 1

|  | Initial Recording Threshold Power (mW) | Recording Threshold Power After $10_8$ Times Erasing and Recording (mW) |
|---|---|---|
| Example 1 | 4.6 | 4.4 |
| Example 2 | 4.7 | 4.7 |
| Example 3 | 4.5 | 4.5 |
| Comparative Example 1 | 4.5 | 3.2 |
| Comparative Example 2 | 4.5 | 3.5 |
| Comparative Example 3 | 4.5 | 4.0 |
| Comparative Example 4 | 4.7 | 4.1 |

TABLE 2

|  | INITIAL | | AFTER $10^8$ TIMES ERASING AND RECORDING | |
|---|---|---|---|---|
| EXAMPLES | Land Level Modulation Factor (%) | Reflectance at Non-Recorded Land Part (%) | Land Level Modulation Factor (%) | Reflectance at Non-Recorded Land Part (%) |
| Example 1 | 88 | 16 | 86 | 15.6 |
| Example 2 | 88 | 16 | 88 | 16.0 |
| Example 3 | 88 | 16 | 88 | 16.0 |
| Comparative Example 1 | 88 | 16 | 80 | 14.5 |
| Comparative Example 2 | 88 | 16 | 80 | 14.5 |
| Comparative Example 3 | 88 | 16 | 87 | 15.6 |
| Comparative Example 4 | 88 | 16 | 80 | 14.5 |

TABLE 3

| EXAMPLES | Initial (dB) | After $10^8$ Reproducing (dB) | Initial (dB) | After $10^8$ Recording Reproducing Erasing (dB) |
|---|---|---|---|---|
| Example 1 | 50 | 50 | 50 | 49 |
| Example 2 | 50 | 50 | 50 | 50 |
| Example 3 | 50 | 50 | 50 | 50 |
| Comparative Example 1 | 50 | 50 | 50 | 45 |
| Comparative Example 2 | 50 | 46 | 50 | 47 |
| Comparative Example 3 | 50 | 46 | 50 | 48 |
| Comparative Example 4 | 50 | 50 | 50 | 47 |

TABLE 4

| EXAMPLES | INITIAL | | | AFTER 10⁸ RECORDING, REPRODUCING AND ERASING | | |
|---|---|---|---|---|---|---|
| | Hc (kOe) | Recording Temp. | Second Harmonics Minimum Recording Power (mW) | Hc (kOe) | Recording Temp. | Second Harmonics Minimum Recording Power (mW) |
| Example 1 | 2.6 | (180° C.) | 6.1 | 2.3 | (180° C.) | 5.9 |
| Example 2 | 2.6 | (180° C.) | 6.3 | 2.6 | (180° C.) | 6.3 |
| Example 3 | 2.6 | (180° C.) | 5.7 | 2.6 | (180° C.) | 5.7 |
| Comparative Example 1 | 1.6 | (160° C.) | 5.5 | 0.4 | (160° C.) | 4.2 |
| Comparative Example 2 | 2.6 | (180° C.) | 5.9 | 1.7 | (180° C.) | 5.0 |
| Comparative Example 3 | 1.6 | (160° C.) | 5.5 | 0.9 | (160° C.) | 4.8 |
| Comparative Example 4 | 2.6 | (180° C.) | 6.3 | 2.0 | (180° C.) | 5.7 |

Figure 5:
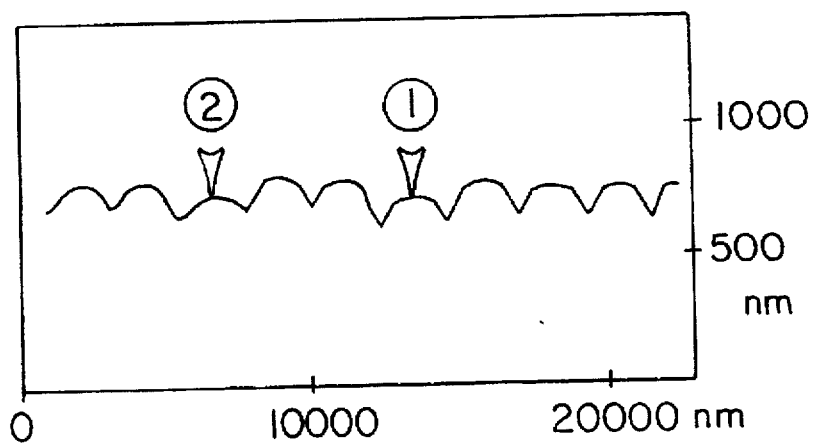
FIG. 5 is a cross-sectional view for tracks on the substrate of comparative example 2 after recording, reproducing and erasing information $10^8$ times.

After the information is recorded, reproduced and erased $10^8$ times under the above condition respectively, a deformation of the substrate is observed by a cross-sectional view for tracks on the substrate with the Atomic Force Microscopy (AFM). FIG. 4 is a cross-sectional view for tracks on the substrate of example 2, after recording, reproducing and erasing information $10^8$ times. FIG. 5 is a cross-sectional view for tracks on the substrate of comparative example 2, after recording, reproducing and erasing information $10^8$ times. Results of the other Examples were the same as for Example 2. Results of the other Comparative Examples were the same as for Comparative Example 2. These Comparative Examples were produced without drying the substrate and/or having two dielectric layer which had the same heat conductivity or heat capacity.

Variations of the minimum recording power, which can produce more than 40 dB of C/N and the power where the secondary harmonics is the minimum, are large in Comparative Examples 1 and 2 having identical dielectric layers and Comparative Example 4 whose substrate was not dried, because when the heat accumulated in the magneto-optical layer or the dielectric layer by the recording or erasing laser power flow to the substrate, it was easy for gas in the substrate to be released and react with the magneto-optical layer giving rise to the reduction of the Curie temperature and causing change in recording sensitivity. Further, seemingly due to the substrate deformation, films sputtered onto the substrate are partially peeled off and the air in between the film and the substrate will act as heat insulator, which again causes change in recording sensitivity.

What is even worse is that a coercive force variation of the TM-rich composition as in the cases of Comparative Examples 1 and 3 is greatly influenced by oxidation of the magneto-optical layer, far greater than that of the RE-rich composition, so that shape and size of the recording bit are deformed after repetitive use.

From Table 3, it is understood the magneto-optical disk in the Comparative Examples exhibit a large coercive force variation after repeated use which leads to a large variation in recording power sensitivity. Because of the large variation in recording power sensitivity, the recording power has to be changed largely after such repeated use.

The recording powers of the disks having a second dielectric layer whose heat conductivity is higher than that of a first dielectric layer are not the same as compared with those having identical compositions for the first and second dielectric layers, because the disks which have a second dielectric layer having a heat conductivity higher than that of a first dielectric layer, can release the heat from a reflective layer side more easily. However, when the composition of the magneto-optical layer is restricted to either a RE-rich composition or TM-rich composition, the comparison of minimum temperature of the magneto-optical disk for recording may be considered the same for each disk, since each disk has the same Curie temperature.

On the other hand, since the disks in the Examples 1 to 3, can give off the heat, which is generated by erasing or recording laser power, from the reflective layer effectively and impurity gas and water in the substrate were eliminate beforehand, oxidation of the magneto-optical layer, deformation of the substrate and peeling off of the layers from the substrate are suppressed effectively. Moreover, even when the magneto-optical layer, which has a RE-rich composition, is oxidized to a certain degree, variations in shape and size of the recording bit in the recording area are very small after erasing, recording and reproducing repeatedly, because of the coercive force-temperature character of the RE-rich composition. Therefore, the magneto-optical disk of the present invention is suitable for repeated use.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A magneto-optical disk comprising:

a transparent substrate having a track, said track having a groove and/or a prepit for address, timing and tracking information on one surface thereof;

a first dielectric layer formed on said track surface of said substrate;

a magneto-optical recording layer formed on said first dielectric layer, said magneto-optical recording layer comprising an alloy material;

a second dielectric layer formed on said magneto-optical recording layer; and a reflective layer for increasing the apparent Kerr rotation angle of said disk formed on said second dielectric layer;

wherein said magneto-optical recording layer is ferrimagnetic material made of a rare earth element metal-transition element metal amorphous having a compensation temperature and a Curie temperature and containing from 22 to 26 atomic % of Tb, said compensation temperature being between said Curie temperature and room temperature, a heat conductivity of said first dielectric layer being smaller than that of said second dielectric layer.

2. The magneto-optical disk according to claim 1, wherein said first dielectric layer comprises a formula $SiN_{x1}$ and said second dielectric layer comprises a formula $SiN_{x2}$, wherein $x_1 > x_2$.

3. The magneto-optical disk according to claim 2, wherein the relationship of $x_1$ and $x_2$ is expressed as:

$$0.90 \leq x_1 \leq 1.3,\ 0.4 \leq x_2 \leq 1.0.$$

4. The magneto-optical disk according to claim 2, wherein the relationship of $x_1$ and $x_2$ is expressed as:

$$0.70 \leq x_1 \leq 1.0,\ 0.4 \leq x_2 \leq 1.0.$$

5. The magneto-optical disk according claim 1, wherein said first dielectric layer comprises a formula $SiN_yO_z$ and said second dielectric layer comprises a formula $SiN_{x2}$, wherein $1.2 \leq 3x_2 < 3y + 2z \leq 4$.

6. A magneto-optical recording disk comprising:

a transparent substrate having a track, said track having a groove and/or a prepit for address, timing and tracking information on one surface thereof;

a first dielectric layer formed on said track surface of said substrate;

a magneto-optical recording layer formed on the surface of said first dielectric layer, said magneto-optical recording layer being made of an alloy material;

a second dielectric layer formed on the surface of said magneto-optical recording layer; and a reflective layer for increasing the apparent Kerr rotation angle of said disk formed on said second dielectric layer; and wherein said magneto-optical recording layer is a ferrimagnetic material made of a rare earth element metal-transition element metal amorphous having a compensation temperature and a Curie temperature and containing from 22 to 26 atomic % of Tb, said compensation temperature being between said Curie temperature and room temperature, a heat capacity of said second dielectric layer being smaller than that of said first dielectric layer.

7. The magneto-optical disk according to claims 1, 2, 3, 4, 5 or 6, wherein said substrate comprises a dried material, dried by standing at the temperature of from 40° C. to 120° C. and under a reduced pressure of less than atmospheric pressure for more than 10 minutes just before said magneto-optical recording layer is formed on said substrate.

8. The magneto-optical disk according to claim 7, wherein said substrate comprises at the most 2000 ppm water.

\* \* \* \* \*